United States Patent
Zhao et al.

(10) Patent No.: US 7,392,703 B2
(45) Date of Patent: Jul. 1, 2008

(54) Z-AXIS THERMAL ACCELEROMETER

(75) Inventors: Yang Zhao, Andover, MA (US); Yongyao Cai, Acton, MA (US)

(73) Assignee: Memsic, Inc., Andover, MA (US)

( * ) Notice: Subject to any disclaimer, the term of this patent is extended or adjusted under 35 U.S.C. 154(b) by 408 days.

(21) Appl. No.: 11/125,759

(22) Filed: May 10, 2005

(65) Prior Publication Data

US 2005/0274187 A1 Dec. 15, 2005

Related U.S. Application Data

(60) Provisional application No. 60/578,273, filed on Jun. 9, 2004.

(51) Int. Cl.
*G01P 15/00* (2006.01)
*G01P 15/08* (2006.01)

(52) U.S. Cl. ............... 73/514.05; 73/514.09; 73/514.33

(58) Field of Classification Search ............. 73/514.05, 73/514.06, 514.09, 514.12, 497, 514.33
See application file for complete search history.

(56) References Cited

U.S. PATENT DOCUMENTS

| | | | | |
|---|---|---|---|---|
| 5,581,034 | A | 12/1996 | Dao et al. | 73/514.09 |
| 5,719,333 | A * | 2/1998 | Hosoi et al. | 73/514.05 |
| 5,786,744 | A * | 7/1998 | Nishio et al. | 338/14 |
| 5,945,601 | A | 8/1999 | Hosoi et al. | 73/514.33 |
| 6,171,880 | B1 * | 1/2001 | Gaitan et al. | 438/52 |
| 6,182,509 | B1 * | 2/2001 | Leung | 73/514.05 |
| 6,589,433 | B2 | 7/2003 | Leung | 216/2 |
| 7,069,785 | B2 * | 7/2006 | Chou | 73/514.09 |
| 2004/0103720 | A1 | 6/2004 | Chou | 73/514.09 |
| 2005/0274180 | A1 * | 12/2005 | Zhao et al. | 73/497 |

FOREIGN PATENT DOCUMENTS

| | | |
|---|---|---|
| DE | 42 43 978 C1 | 1/1994 |
| DE | 102 30 198 A1 | 1/2004 |
| EP | WO 02/41007 | 5/2002 |
| WO | WO 02/41007 A2 | 5/2002 |

OTHER PUBLICATIONS

Japanese Abstract of Publication No. 2000 065850, Publication Date of Mar. 3, 2000 for "Thermal Type Acceleration Sensor".

* cited by examiner

*Primary Examiner*—Helen C. Kwok
(74) *Attorney, Agent, or Firm*—Weingarten, Schurgin, Gagnebin & Lebovici LLP

(57) ABSTRACT

A thermal accelerometer device that allows up to three axes of acceleration sensing. The thermal accelerometer includes a substantially planar substrate, a cavity formed in the substrate, a heater element, and at least first and second temperature sensing elements. The heater element is suspended over the cavity, and the first and second temperature sensing elements are disposed along the X or Y axis in the substrate plane on opposite sides of and at equal distances from the heater element. The thermal accelerometer employs differential temperatures detected by the temperature sensing elements to provide indications of acceleration in the X or Y directions. Further, the thermal accelerometer employs a common mode temperature detected by the temperature sensing elements to provide an indication of acceleration along a Z axis perpendicular to the X and Y axes.

16 Claims, 6 Drawing Sheets

Z-AXIS THERMAL ACCELEROMETER

CROSS REFERENCE TO RELATED APPLICATIONS

This application claims priority of U.S. Provisional Patent Application No. 60/578,273 filed Jun. 9, 2004 entitled Z-AXIS THERMAL ACCELEROMETER.

STATEMENT REGARDING FEDERALLY SPONSORED RESEARCH OR DEVELOPMENT

N/A

BACKGROUND OF THE INVENTION

The present application relates generally to micro-machined convective accelerometers, and more specifically to thermal accelerometers capable of detecting acceleration along multiple axes.

Thermal accelerometers are known that have the capability of detecting acceleration along multiple axes. For example, U.S. Pat. No. 6,182,509 (the '509 patent) discloses a thermal accelerometer device configured to detect acceleration in 2-axes. As disclosed in the '509 patent, the 2-axes thermal accelerometer comprises a substrate having a cavity etched therein, and a structure including a small heater plate and four temperature sensors suspended over the cavity. The heater plate is positioned at the center of the suspended structure, which is in a plane defined by X and Y axes. Further, two of the four temperature sensors are placed along the X axis on opposite sides of and at equal distances from the heater plate, while the other two temperature sensors are similarly placed along the Y axis on opposite sides of and at equal distances from the heater plate. In a typical mode of operation, electrical current is passed through the heater plate, which heats the surrounding air to generate a symmetrical temperature gradient in both the X and Y axes. Because the respective pairs of temperature sensors disposed on the X and Y axes are equidistant from the heater plate, the differential temperature between each pair of temperature sensors is initially zero. However, if an accelerating force is applied to the device in a direction parallel to the X-Y plane, then the temperature distribution of the air shifts. Specifically, when acceleration is applied in the X direction, a differential temperature is detected by the temperature sensors disposed on the X axis. Similarly, when acceleration is applied in the Y direction, a differential temperature is detected by the temperature sensors disposed on the Y axis. A bridge circuit and a differential amplifier are employed to generate signals representing the detected differential temperatures, which are proportional to the acceleration applied along the respective axes. According to the '509 patent, the 2-axes thermal accelerometer can be fabricated using known CMOS or bipolar processes, thereby allowing the accelerometer to be integrated with signal conditioning circuitry with relatively low cost.

One drawback of the 2-axes thermal accelerometer described in the '509 patent is that it cannot be easily configured to satisfy applications requiring acceleration sensing in three axes. For example, to sense acceleration in three dimensions, the '509 patent indicates that at least two thermal accelerometers may be oriented at right angles to each other, resulting in a 3-dimensional accelerometer device structure. Such 3-dimensional device structures are typically implemented using a motherboard and at least one daughter board. However, implementing a 3-axes thermal accelerometer with multiple printed circuit boards can significantly increase the cost and complexity of the device and reduce reliability, thereby making the thermal accelerometer unsuitable for use in many consumer electronics and automotive applications.

It would therefore be desirable to have a low cost thermal accelerometer that can be configured to provide up to three axes of acceleration sensing. Such a thermal accelerometer would provide high reliability, while avoiding the drawbacks of conventional thermal accelerometer devices.

BRIEF SUMMARY OF THE INVENTION

In accordance with the present invention, a thermal accelerometer device is provided that allows up to three axes of acceleration sensing. The presently disclosed thermal accelerometer comprises a 2-dimensional structure disposed in a plane defined by X and Y axes. The thermal accelerometer employs differential temperatures detected by temperature sensing elements disposed on the X and/or Y axes on opposite sides of and at equal distances from a heater element to provide indications of acceleration in the X and/or Y directions. Further, the thermal accelerometer employs a common mode temperature detected by at least one temperature sensing element disposed in the X-Y plane adjacent to the heater element to provide an indication of acceleration along a Z axis perpendicular to the X and Y axes. The thermal accelerometer includes amplification circuitry configured to increase the sensitivity of the device in the Z direction.

In one embodiment, the thermal accelerometer comprises a thermal acceleration sensor including a substrate having a substantially planar surface defined by the X and Y axes, at least one cavity formed in the substrate, at least one heater element, first and second temperature sensing elements, and an internal reference voltage. The heater element is suspended over the cavity in the X-Y plane, and the first and second temperature sensing elements are disposed along the X axis or the Y axis on opposite sides of and at equal distances from the heater element. The thermal accelerometer further includes amplification circuitry operative to receive signals representing a differential temperature detected by the first and second temperature sensing elements, in which the differential temperature is indicative of a sensed acceleration in the X or Y direction. The amplification circuitry is further operative to receive signals representing a common mode temperature detected by the first and second temperature sensing elements, in which the common mode temperature is indicative of a sensed acceleration in the Z direction. The amplification circuitry produces output voltages representative of the magnitudes of acceleration along the respective axes. The amplification circuitry is configured to reduce both DC offset and drift introduced by the internal reference voltage, thereby increasing the sensitivity of acceleration sensing in the Z direction. Because the thermal accelerometer may be implemented using fabrication techniques that are compatible with CMOS and bipolar processes, manufacturing costs can be reduced while assuring a high level of reliability.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

U.S. Provisional Patent Application No. 60/578,273 filed Jun. 9, 2004 entitled Z-AXIS THERMAL ACCELEROMETER is incorporated herein by reference.

A thermal accelerometer device is disclosed that provides up to three axes of acceleration sensing. The presently disclosed thermal accelerometer employs differential temperatures detected by temperature sensing elements disposed in an X-Y plane of the device to provide indications of acceleration in the X and/or Y directions. Further, the thermal accelerometer employs a common mode temperature detected by the temperature sensing elements to provide an indication of acceleration along a Z axis perpendicular to the X-Y plane. The thermal accelerometer includes amplification circuitry operative to increase the sensitivity of acceleration sensing in the Z direction.

Figure 1:
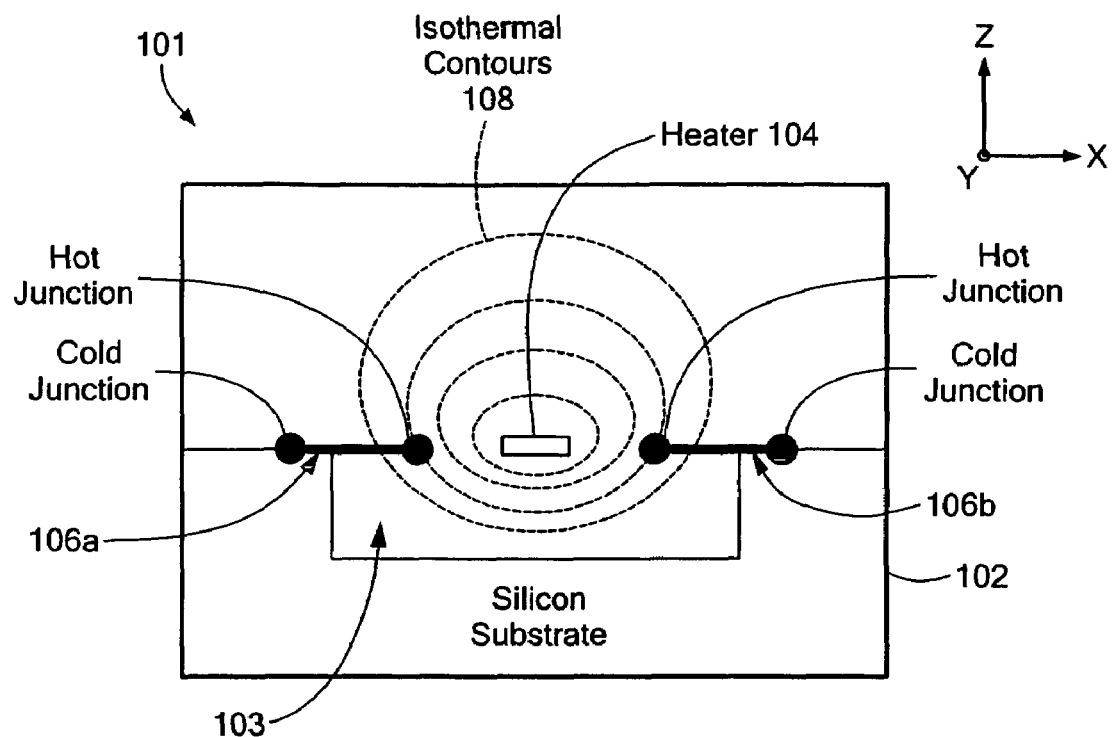
FIG. 1 is a cross-sectional view of a thermal acceleration sensor including a heater element and a pair of thermocouples according to the present invention, showing isothermal contours generated by the heater element.

FIG. 1 depicts an illustrative embodiment of a thermal acceleration sensor 101, in accordance with the present invention. In the illustrated embodiment, the thermal acceleration sensor 101 includes a substantially planar substrate 102, a cavity 103 formed in the substrate 102, a heater element 104 suspended over the cavity 103, and first and second temperature sensing elements 106a-106b. Each one of the first and second temperature sensing elements 106a-106b includes a cold junction at one end thereof attached to a surface of the substrate 102, and a hot junction at the other end thereof suspended over the cavity 103. The thermal acceleration sensor 101 further includes a fluid disposed in the cavity 103 to allow convective heat transfer to occur in the vicinity of the cavity 103. The heater element 104 is operative to produce a temperature gradient within the fluid, as represented by a plurality of isothermal contours 108.

As shown in FIG. 1, the isothermal contours 108 indicate that the temperature gradient produced by the heater element 104 is symmetrical in the X or "horizontal" direction. It is understood that the temperature gradient is also symmetrical in the horizontal direction of the Y axis, which extends into the drawing sheet of FIG. 1. In contrast, the temperature gradient is asymmetrical in the Z or "vertical" direction, e.g., the isothermal contours 108 are closer together below the heater element 104 within the cavity 103, and spaced successively farther apart above the heater element 104 away from the cavity 103. Accordingly, the temperature gradient at each hot junction of the temperature sensing elements 106a-106b includes a vertical component having a magnitude that is dependent upon both the thermal asymmetry in the Z direction and the position of the hot junction relative to the heater element 104.

Because, in the preferred embodiment, the temperature sensing elements 106a-106b are disposed at substantially equal distances from the heater element 104, the symmetrical temperature gradient along the X axis causes the differential temperature between the temperature sensing elements 106a-106b to be zero when the thermal acceleration sensor 101 is at rest. In the event an accelerating force is applied to the sensor 101 in the X direction, the temperature distribution shifts, thereby allowing a non-zero differential temperature proportional to the magnitude of the applied acceleration to be detected by the temperature sensing elements 106a-106b. It is understood that, in response to an applied acceleration in the Y direction, a non-zero differential temperature can also be detected by temperature sensing elements (not shown) placed along the Y axis on opposite sides of and at equal distances from the heater element 104. In the event an accelerating force is applied to the sensor 101 in the Z direction, the temperature distribution again shifts, however, the shifting temperature gradient affects both of the temperature sensing elements 106a-106b in the same way. As a result, the common mode temperature detected by the temperature sensing elements 106a-106b changes, and the magnitude of this temperature change is proportional to the magnitude of the applied acceleration in the Z direction. In general, under constant heater power, the common mode temperature of the hot junctions of the temperature sensing elements 106a-106b is indicative of acceleration in the Z or vertical direction.

In one embodiment, the substrate 102 is made of silicon. Further, each temperature sensing element 106a-106b is implemented as a thermocouple, the heater element 104 is implemented as a heater resistor, and the fluid providing convective heat transfer within the cavity 103 comprises a quantity of air. Those of ordinary skill in this art will appreciate that the thermocouples 106a-106b and the heater resistor 104 can be fabricated as part of a 2-dimensional structure using known CMOS or bipolar processes. Moreover, the cavity 103 can be formed by etching or by micro-machining the surface of the substrate 102 using any suitable micro-machining technique.

Figure 2:
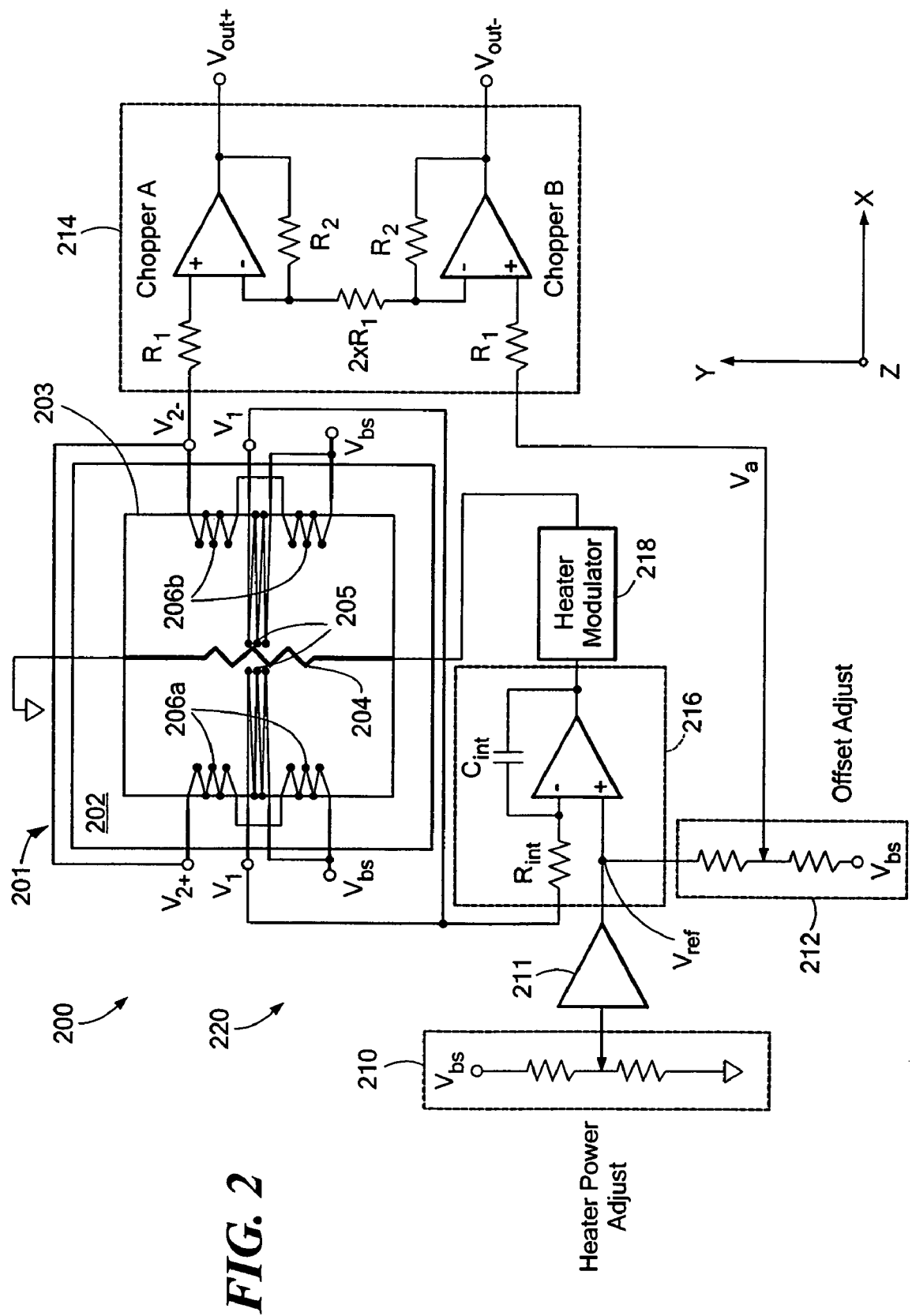
FIG. 2 is a schematic diagram of a z-axis thermal accelerometer according to the present invention, including the thermal acceleration sensor of FIG. 1 and amplification circuitry for increasing the sensitivity of acceleration sensing in the Z or "vertical" direction.

FIG. 2 depicts an illustrative embodiment of a z-axis thermal accelerometer 200, in accordance with the present invention. In the illustrated embodiment, the z-axis thermal accelerometer 200 comprises a thermal acceleration sensor 201, heater power adjustment circuitry 220, DC offset adjustment circuitry 212, and amplification circuitry 214 for providing output voltages $V_{out+}$, $V_{out-}$ representing the magnitude of acceleration along the Z axis. It is noted that the thermal acceleration sensor 101 of FIG. 1 is a simplified representation of the thermal acceleration sensor 201 of FIG. 2.

As shown in FIG. 2, the thermal acceleration sensor 201 includes a substantially planar substrate 202, a cavity 203 formed in the substrate 202, a heater element 204 suspended over the cavity 203, and first and second temperature sensing elements 206a-206b. The thermal acceleration sensor 201 further includes third temperature sensing elements 205, which are disposed near or on the heater element 204 for measuring the temperature of the heater. In the illustrated embodiment, the first, second, and third temperature sensing elements 206a-206b, 205 comprise respective thermocouples, and the heater element 204 is implemented as a heater resistor. Moreover, the cavity 203 is formed by etching the substrate 202, leaving a bridge (not shown) of substrate material across the cavity 203 upon which the heater resistor 204 and junctions of the thermocouples 205 are disposed. It is noted that bridges (see, e.g., elements 432a-432b of FIG. 4) of substrate material are also formed across the cavity 203 upon which the junctions of the thermocouples 206a-206b are disposed. In addition, the heater power adjustment circuitry 220 comprises a first voltage divider 210, a buffer 211, an integrator circuit 216 including an input resistor $R_{int}$ and a feedback capacitor $C_{int}$, and a heater modulator 218; the DC offset adjustment circuitry 212 includes a second voltage divider; and, the amplification circuitry 214 includes two converter or "chopper" amplifiers A-B for providing the differential output voltages $V_{out+}$, $V_{out-}$, respectively.

It should be appreciated that the substrate 202 has a substantially planar surface defined by the X and Y axes, and that the thermocouples 206a-206b are disposed along the X axis on opposite sides of and at equal distances from the heater resistor 204. The thermal acceleration sensor 201 therefore has the capability of sensing acceleration along a single horizontal axis (X axis), and along the vertical axis (Z axis). It is understood, however, that the thermal acceleration sensor 201 may also be configured to sense acceleration in the Y direction by operatively disposing a pair of thermocouples (not shown) along the Y axis on opposite sides of and at equal distances from the heater resistor 204. In this way, the thermal acceleration sensor 201 can be configured to provide up to three axes of acceleration sensing.

Each one of the thermocouples 205, 206a-206b included in the thermal acceleration sensor 201 has a first terminal connected to an internal reference voltage $V_{bs}$. In the presently disclosed embodiment, the reference voltage $V_{bs}$ is a bandgap reference voltage. The reference voltage $V_{bs}$ is employed within the z-axis thermal accelerometer 200 as an analog common reference point and/or to bias circuits included therein independent of the supply voltage (not shown). Each one of the thermocouples 205, 206a-206b also has a second terminal, specifically, the thermocouples 205 have respective second terminals providing a voltage level $V_1$, the thermocouple 206a has a second terminal providing a voltage level $V_{2+}$, and the thermocouple 206b has a second terminal providing a voltage level $V_{2-}$.

As described above, the thermal acceleration sensor 201 has the capability of sensing acceleration in the X and Z directions. To that end, an indication of a differential temperature detected by the thermocouples 206a-206b is obtained by taking the difference of the voltage levels $V_{2+}$ and $V_{2-}$. Further, an indication of a common mode temperature detected by the thermocouples 206a-206b is obtained by taking the average of the voltage levels $V_{2+}$ and $V_{2-}$. The differential temperature is indicative of a sensed acceleration in X direction, and the common mode temperature is indicative of a sensed acceleration in the Z direction.

For example, the average of the voltage levels $V_{2+}$ and $V_{2-}$ can be easily obtained by connecting the second terminals ($V_{2+}$, $V_{2-}$) of the thermocouples 206a-206b to each other, as shown in FIG. 2. Such a circuit configuration, however, would disallow a determination of the difference of the voltage levels $V_{2+}$ and $V_{2-}$. In the event acceleration sensing is desired in both the horizontal and vertical directions, the average of the voltage levels $V_{2+}$ and $V_{2-}$ may alternatively be obtained using a differential instrumentation amplifier, a summing circuit, and/or any other suitable circuit configuration or technique. Further, the difference of the voltage levels $V_{2+}$ and $V_{2-}$ may be obtained using a bridge circuit, a differential amplifier, and/or any other suitable circuit configuration or technique. As shown in FIG. 2, the second terminals ($V_{2+}$, $V_{2-}$) of the thermocouples 206a-206b are connected to each other, and to an input resistor $R_1$ coupled to a non-inverting input of an operational amplifier (op amp; not numbered) included in the chopper amplifier A. It is noted that the amplification circuitry 214 is configured to provide the differential output voltages $V_{out+}$, $V_{out-}$ for facilitating the measurement of the average of $V_{2+}$ and $V_{2-}$.

As also described above, the thermocouples 205 are disposed near or on the heater resistor 204 for measuring the temperature of the heater. In the presently disclosed embodiment, the heater temperature is proportional to the voltage level $V_1$ at the respective second terminals of the thermocouples 205. As shown in FIG. 2, the voltage level $V_1$ is provided to the heater power adjustment circuitry 220, specifically, to the input resistor $R_{int}$ coupled to an inverting input of an op amp (not numbered) included in the integrator circuit 216. Further, the first voltage divider 210 and the buffer 211 provide a heater control reference voltage $V_{ref}$ to the non-inverting input of the op amp included in the integrator circuit 216. The voltage divider 210 includes a pair of resistors connected in series between the internal reference voltage $V_{bs}$ and ground, and the common node connection of the serially connected resistors is coupled to the input of the buffer 211. In the preferred embodiment, the voltage divider 210 is adjustable to provide a desired voltage level $V_{ref}$ to the integrator circuit 216. The heater modulator 218 is operatively connected between the output of the integrator circuit 216 and the heater resistor 204. For example, the heater modulator 218 may employ pulse-density modulation (PDM), pulse-width modulation (PWM), or any other suitable modulation technique for controlling the temperature of the heater. The integrator circuit 216 and the heater modulator 218 are operative to adjust the power of the heater resistor 204 directly, effectively forcing the voltage level $V_1$ to be equal to the level of the heater control reference voltage $V_{ref}$.

The second voltage divider included in the DC offset adjustment circuitry 212 provides a tunable base line voltage $V_a$ to the amplification circuitry 214 for use in minimizing a DC offset voltage from the differential output voltages $V_{out+}$, $V_{out-}$. The second voltage divider 212 includes a pair of resistors connected in series between the heater control reference voltage $V_{ref}$ and the internal reference voltage $V_{bs}$. Further, the common node connection of the serially connected resistors is coupled to the amplification circuitry 214, specifically, to an input resistor $R_1$ coupled to a non-inverting input of an op amp included in the chopper amplifier B. In the preferred embodiment, the voltage divider 212 is adjustable to provide a desired voltage level $V_a$ to the amplification circuitry 214 for minimizing the DC offset.

Because the thermocouples 205, 206a-206b and the heater resistor 204 can be fabricated as part of a 2-dimensional structure using known CMOS or bipolar processes, the z-axis thermal accelerometer 200 including the thermal acceleration sensor 201, the heater power adjustment circuitry 220, the DC offset adjustment circuitry 212, and the amplification circuitry 214 can be implemented in an integrated circuit (IC) to provide a low cost, highly reliable 1-3 axes thermal accelerometer for use in consumer electronics and/or automotive applications.

It is noted that the levels of DC offset and drift introduced by fluctuations in the internal reference voltage $V_{bs}$ can be relatively high over typical temperature ranges observed in automobile environments. For example, in a CMOS process, the level of a band-gap reference voltage may have a drift proportional to several Gs over the typical automobile temperature range. Further, an initial DC offset introduced by such a band-gap reference voltage may be characterized by a standard deviation of about 100 Gs. Such fluctuations in the reference voltage $V_{bs}$ can be effectively canceled by using a Wheatstone bridge circuit configuration to provide the tunable DC offset-zeroing voltage $V_a$.

Figure 3:
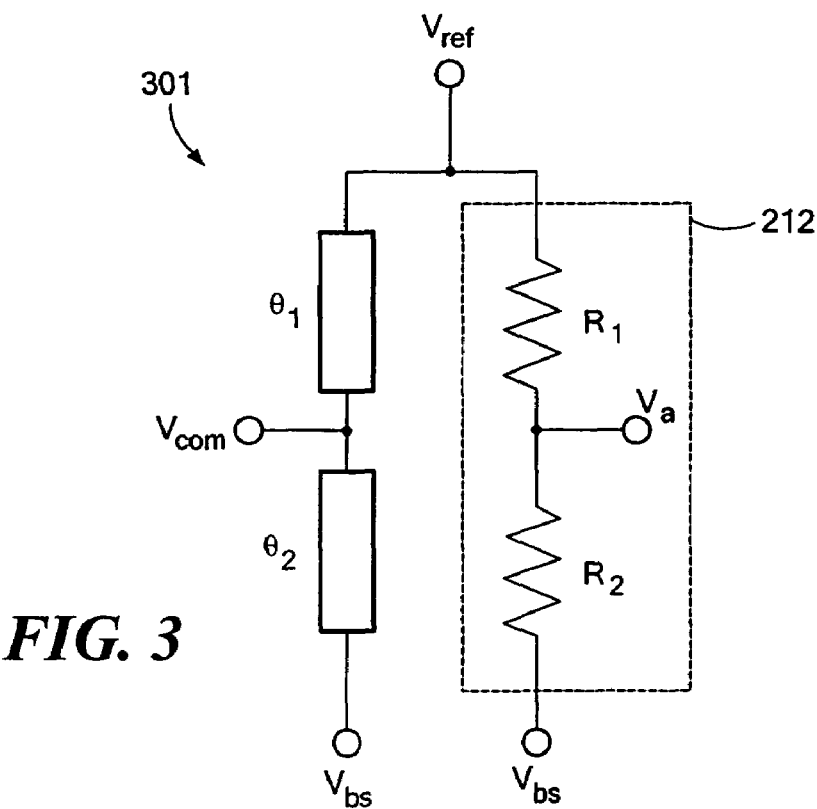
FIG. 3 is a schematic diagram of circuitry for providing a tunable DC offset-zeroing voltage included in the amplification circuitry of FIG. 2.

FIG. 3 depicts an illustrative circuit 301, which, in effect, operates as a Wheatstone bridge for providing the DC offset-zeroing voltage $V_a$. In the illustrated embodiment, the effective Wheatstone bridge circuit 301 includes the resistors $R_1$-$R_2$ of the voltage divider 212 and thermal resistances $\theta_1$-$\theta_2$, in which $\theta_1$ represents the thermal resistance from the heater resistor 204 to the hot junction of the thermocouple 206a or 206b, and $\theta_2$ represents the thermal resistance from the thermocouple hot junction to the substrate 202 (see also FIG. 2). Specifically, the thermal resistances $\theta_1$-$\theta_2$ are connected in series between the heater control reference voltage $V_{ref}$ and the internal reference voltage $V_{bs}$. Further, the thermocouple hot junction provides a voltage level $V_{com}$ at the common node of the thermal resistances $\theta_1$-$\theta_2$. By taking the difference of the voltage levels $V_a$ and $V_{com}$, a signal representative of the sensed acceleration in the Z direction can be obtained while effectively canceling small fluctuations that might occur in the level of the reference voltage $V_{bs}$. Because small fluctuations in the reference voltage $V_{bs}$ are effectively canceled, the drift of the output voltage of the z-axis thermal accelerometer 200 is minimized. In addition, the design requirements for producing a stable $V_{bs}$ are significantly reduced.

In the preferred embodiment, the thermal resistance $\theta_1$ has the same temperature properties, i.e., the same temperature coefficients, as the thermal resistance $\theta_2$ to minimize the drift over the temperature range of interest. Those of ordinary skill in this art will appreciate, however, that in a practical circuit configuration, the thermal resistances $\theta_1$-$\theta_2$ are normally not the same due to the different area densities of the heater bridge and the respective bridges of the thermocouples 206a-206b, and due to the different compositions of the heater and thermocouple bridges. For example, the area density from the heater bridge to the hot junction of the thermocouple 206a or 206b is normally smaller than the area density of the thermocouple bridges. Moreover, there is typically some metal present in the thermocouple bridges, but not in the heater bridge. The single horizontal axis structure of the thermal acceleration sensor 201 advantageously makes the temperature coefficient of the thermal resistance $\theta_1$ substantially the same as the temperature coefficient of the thermal resistance $\theta_2$.

Figure 4:
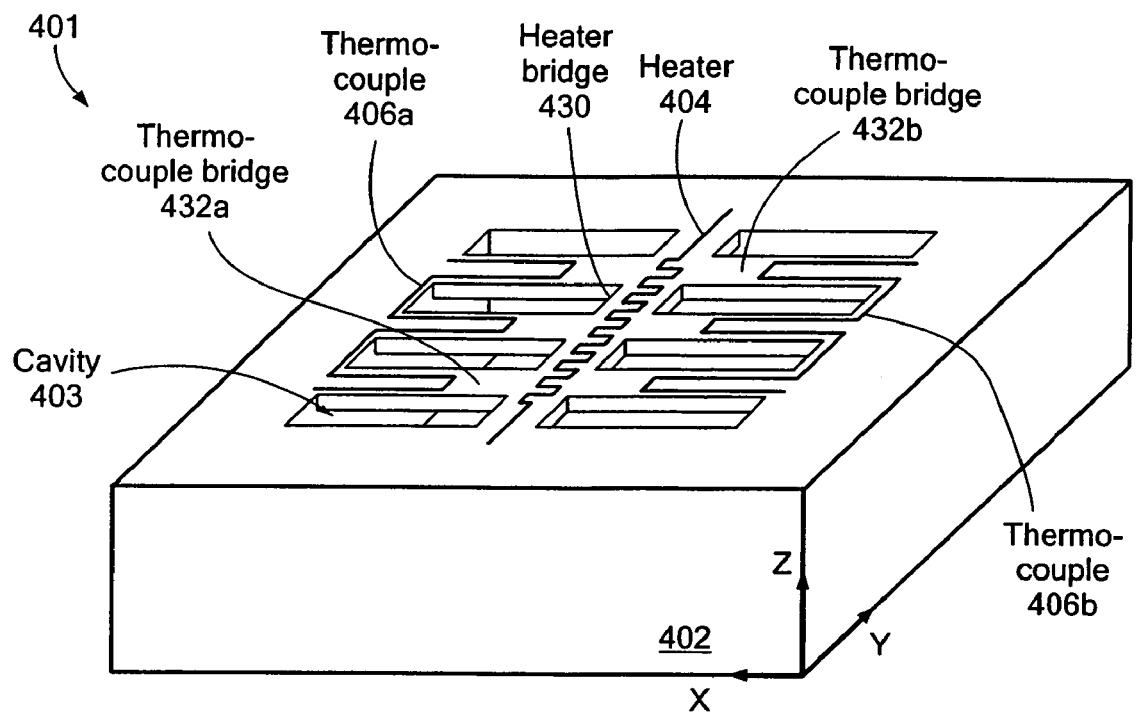
FIG. 4 is a perspective view of an illustrative embodiment of the thermal acceleration sensor of FIG. 1, in which the thermal acceleration sensor has a single axis structure configured to enhance the performance of the tunable DC offset-zeroing voltage circuitry of FIG. 3.

FIG. 4 depicts a detailed perspective view of a thermal acceleration sensor 401 having a single axis structure like that of the thermal acceleration sensor 201 (see FIG. 2). In the illustrated embodiment, the thermal acceleration sensor 401 includes a substrate 402, a cavity 403 etched in the substrate 402, a heater bridge 430 disposed across the cavity 403, a heater resistor 404 placed on the heater bridge 430, thermocouple bridges 432a-432b disposed across the cavity 403, and respective acceleration sensing thermocouples 406a-406b placed on the thermocouple bridges 432a-432b. As shown in FIG. 4, the thermocouple bridges 432a-432b cross the heater bridge 430 at about a 90° degree angle. As a result, the area density from the heater bridge 430 to the hot junction of the thermocouple 406a or 406b is increased to a level approximately equal to the area density from the thermocouple hot junction to the edge of the cavity 430, thereby making the thermal resistance $\theta_1$ substantially equal to the thermal resistance $\theta_2$.

Figure 5:
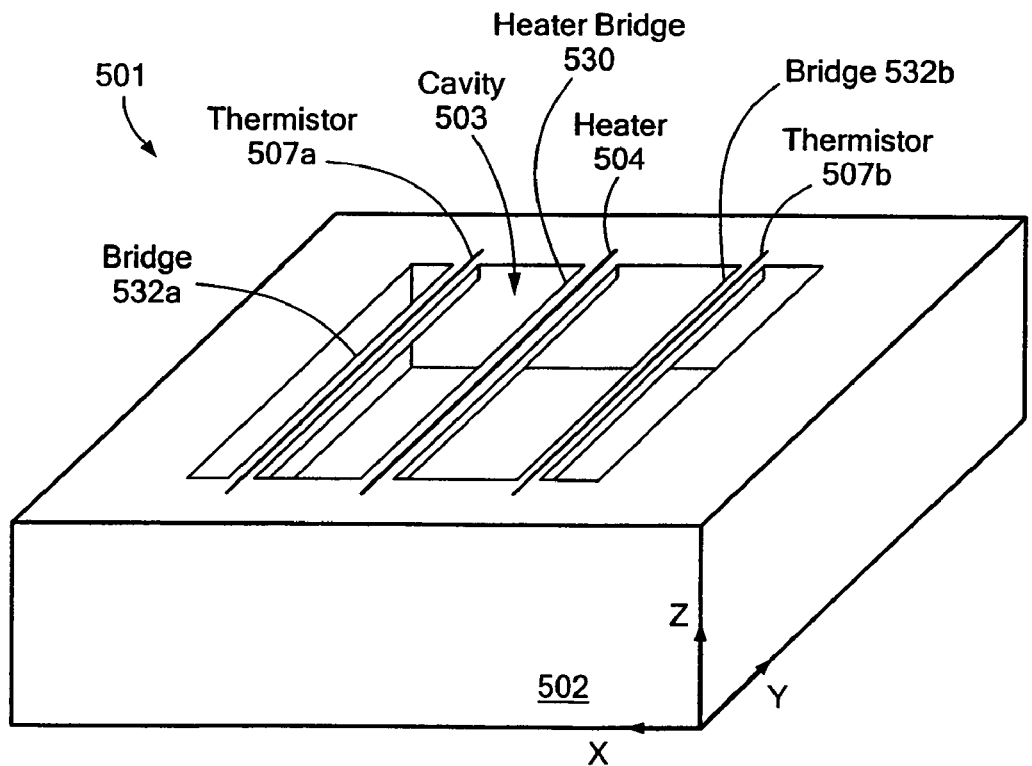
FIG. 5 is a perspective view of a first alternative embodiment of the thermal acceleration sensor of FIG. 1, in which the thermal acceleration sensor includes two thermistors disposed on opposite sides of and at equal distances from the heater element for enhancing the performance of the tunable DC offset-zeroing voltage circuitry of FIG. 3.

FIG. 5 depicts a first alternative embodiment 501 of the thermal acceleration sensor 201 (see FIG. 2). In this alternative embodiment, the thermal acceleration sensor 501 includes a substrate 502, a cavity 503 etched in the substrate 502, a heater bridge 530 disposed across the cavity 503, and a heater resistor 504 placed on the heater bridge 530. The thermal acceleration sensor 501 further includes bridges 532a-532b disposed across the cavity 503, and respective acceleration sensing thermistors 507a-507b placed on the bridges 532a-532b. Like the thermal acceleration sensor 201, the thermal acceleration sensor 601 can be fabricated as part of a 2-dimensional structure using known CMOS or bipolar processes.

As shown in FIG. 5, the thermistor bridges 532a-532b are substantially parallel to the heater bridge 530. It is noted that the thermistors 507a-507b are employed in the thermal acceleration sensor 501 in place of the hot junctions of the thermocouples 406a-406b disposed on the thermocouple bridges 432a-432b, which are perpendicular to the heater bridge 430 (see FIG. 4). In the embodiment of FIG. 5, $\theta_1$ represents the thermal resistance from the heater resistor 504 to the thermistor 507a or 507b, and $\theta_2$ represents the thermal resistance from the thermistor 507a or 507b to the substrate 502. Because thermistor bridges perpendicular to the heater bridge 530 are not required in the embodiment of FIG. 5, the thermal acceleration sensor 501 provides increased thermal efficiency.

Figure 6:
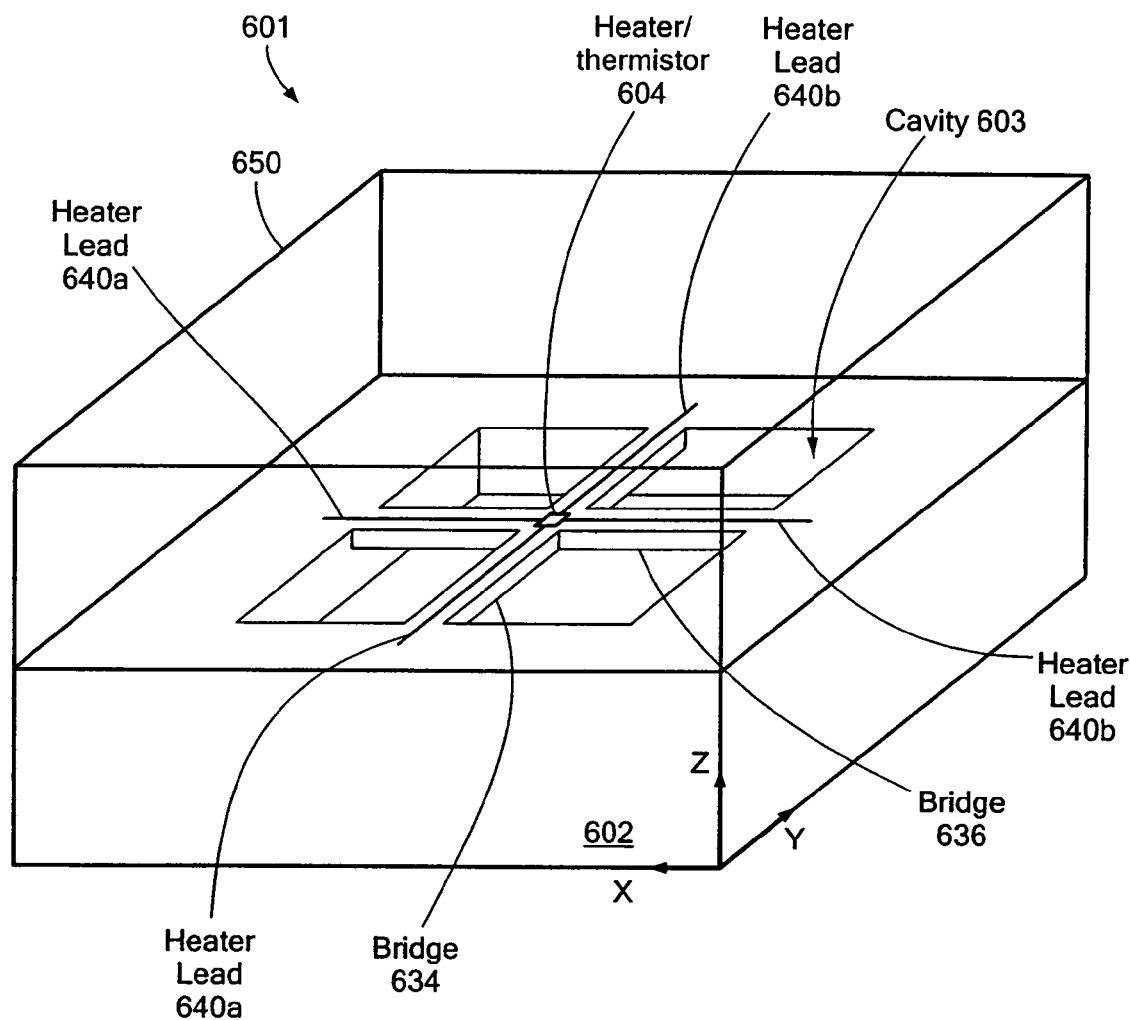
FIG. 6 is a perspective view of a second alternative embodiment of the thermal acceleration sensor of FIG. 1, in which the thermal acceleration sensor is configured to provide a signal representing a vector sum of total acceleration in 3-axes.

FIG. 6 depicts a second alternative embodiment 601 of the thermal acceleration sensor 201 (see FIG. 2). In this alternative embodiment, the thermal acceleration sensor 601 includes a substrate 602, a cavity 603 etched in the substrate 602, a first bridge 634 disposed across the cavity 603, a second bridge 636 disposed across the cavity 603 at substantially a 90° angle to the first bridge 634, a heater element 604 placed at the intersection of the first and second bridges 634 and 636, and heater leads 640a-640b connected to the heater element 604. Whereas the thermal acceleration sensor 201 is configured to detect a differential temperature indicative of acceleration in a horizontal direction and a common mode temperature indicative of acceleration in the vertical direction, the thermal acceleration sensor 601 is configured to detect a vector sum of total acceleration along 3 axes. Like the thermal acceleration sensor 201, the thermal acceleration sensor 601 can be fabricated as part of a 2-dimensional structure using known CMOS or bipolar processes.

In the preferred embodiment, the heater element 604 is a point heater having a size that is small relative to the overall structure of the thermal acceleration sensor 601. Further, the heater leads 640a-640b are connected to an on-chip heater modulator or regulation circuit (see, e.g., element 218 of FIG. 2). Alternatively, the heater leads 640a-640b may be connected to an off-chip heater power source. The entire structure of the thermal acceleration sensor 601 is enclosed in a hermetically sealed package 650, and a fluid such as air is disposed within the sealed package. In a typical mode of operation, when no acceleration (including gravity) is applied to the thermal acceleration sensor 601, the mechanism of heat transfer from the point heater 604 to the package 650 comprises conduction only. When acceleration is applied to the thermal acceleration sensor 601, the mechanism of heat transfer within the package 650 comprises both conduction and convection.

Accordingly, under constant heater power, a decrease in temperature may be detected at the point heater 604 in the presence of an applied acceleration. In the illustrated embodiment, a thermistor is provided near or on the point heater 604 to measure this change in temperature, which is indicative of the vector sum of total acceleration along the X, Y, and Z axes. Alternatively, the change in temperature at the point heater 604 may be determined by measuring a corresponding change in the resistance of the point heater 604. The temperature change at the point heater 604 may also be measured using thermocouples placed near or on the point heater 604. In addition, in the event the point heater 604 is not powered by a constant power source, the increased heat loss due to an applied acceleration at the point heater 604 may be measured by determining the amount of power required to maintain the point heater 604 at a constant temperature in the presence of the acceleration.

Figure 7:
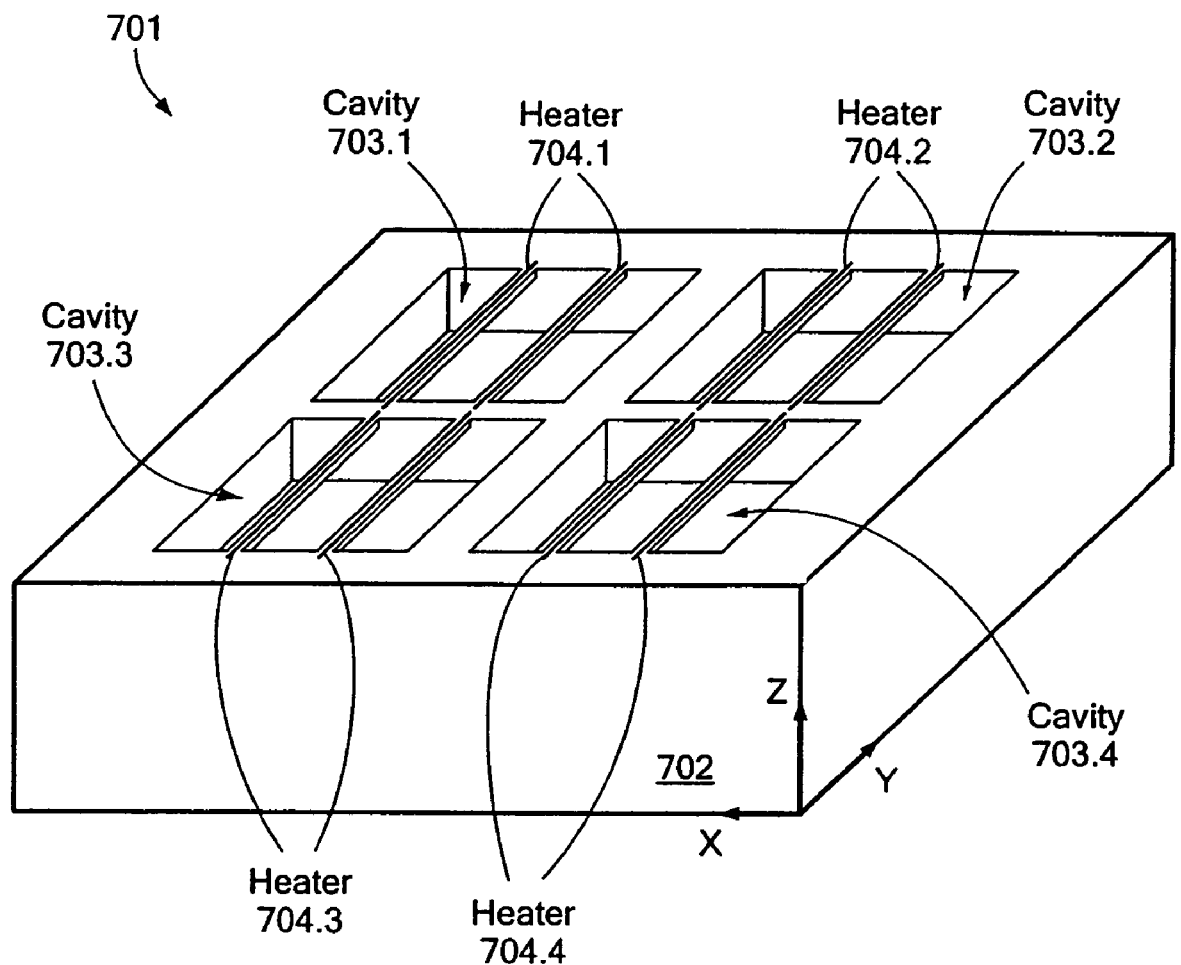
FIG. 7 is a perspective view of a third alternative embodiment of the thermal acceleration sensor of FIG. 1, in which the thermal acceleration sensor includes a plurality of cavities formed in a substrate, and a plurality of heater elements disposed across the respective cavities.

FIG. 7 depicts a third alternative embodiment 701 of the thermal acceleration sensor 201 (see FIG. 2). In this alternative embodiment, the thermal acceleration sensor 701 includes a substrate 702, a cavity array including a plurality of cavities 703.1-703.4 etched in the substrate 702, and a plurality of heater arrays 704.1-704.4 on heater bridges (not numbered) disposed across the cavities 703.1-703.4, respectively. It should be understood that the cavity array can include two or more cavities etched in the substrate 702, and that each one of the heater arrays 704.1-704.4 can include two or more heater elements disposed across the respective cavities 703.1-703.4. It is also understood that the thermal acceleration sensor 701 includes temperature sensing elements (not shown) operatively disposed near the heater arrays 704.1-704.4 for detecting changes in the differential temperature within the cavities 703.1-703.4 in the presence of an applied accelerating force. The temperature sensing elements are omitted from the drawing figure of the thermal acceleration sensor 701 for purposes of clarity.

Figure 8:
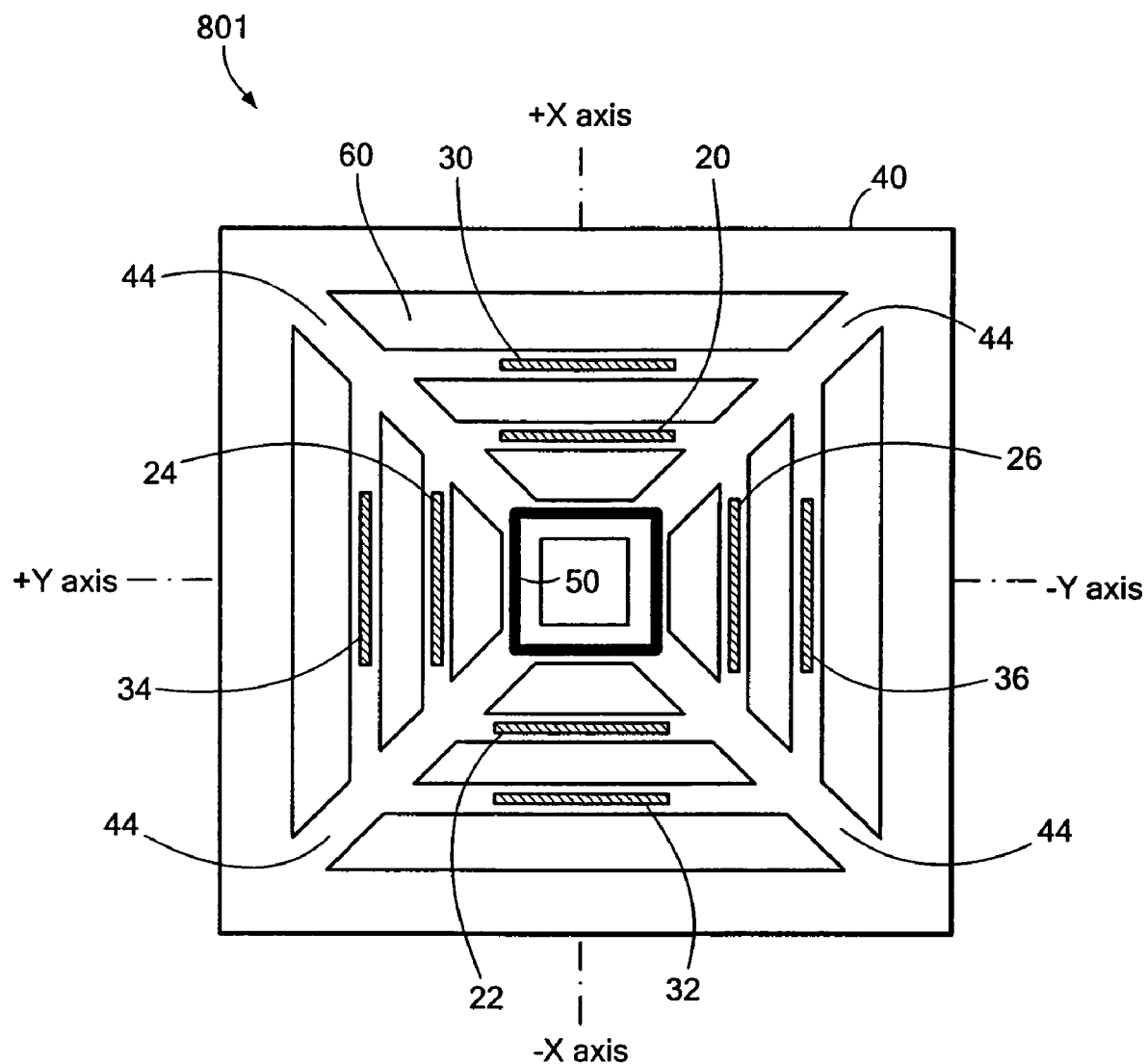
FIG. 8 is a planar view of a fourth alternative embodiment of the thermal acceleration sensor of FIG. 1, in which the thermal acceleration sensor includes two sets of thermocouples configured to provide signals representing acceleration along the Z axis and the X/Y axes, respectively.

FIG. 8 depicts a fourth alternative embodiment 801 of the thermal acceleration sensor 201 (see FIG. 2). In this alternative embodiment, the thermal acceleration sensor 801 includes a substrate 40, a plurality of cavities such as a cavity 60 etched in the substrate 40, a bridge structure including bridges 44 suspended over the cavities, a heater element 50, a first set of thermocouples 20, 22, 24, 26, and a second set of thermocouples 30, 32, 34, 36. As shown in FIG. 8, the heater element 50, the first set of thermocouples 20, 22, 24, 26, and the second set of thermocouples 30, 32, 34, 36 are disposed on respective portions of the bridge structure. The heater element 50 is located approximately at the center of the bridge structure, the members of each thermocouple pair 20, 22 and 30, 32 are disposed along the X axis on opposite sides of and approximately equidistant from the heater element 50, and the members of each thermocouple pair 24, 26 and 34, 36 are disposed along the Y axis on opposite sides of and approximately equidistant from the heater element 50.

In the illustrated embodiment, the thermocouple pairs 20, 22 and 24, 26 are operative to sense acceleration in the X and Y directions, respectively. Moreover, the thermocouples 30, 32, 34, 36 are operative to provide a signal representing the sensed acceleration in the Z direction (perpendicular to the drawing sheet). Because the acceleration sensing in the X/Y directions and the Z direction are provided by separate groups of thermocouples, the signals representing the sensed acceleration in the X/Y directions and the Z direction can be optimized separately. For example, the thermal acceleration sensor 801 can be configured to provide optimal locations for the thermocouple pairs 20, 22 and 24, 26 to optimize the signals corresponding to the X/Y directions, and to provide optimal locations for the thermocouples 30, 32, 34, 36 to optimize the signal corresponding to the Z direction. In addition, a heater control circuit (not shown) for the heater element 50 can be configured to employ the common mode signal of the thermocouples 20, 22 disposed along the X axis and/or the thermocouples 24, 26 disposed along the Y axis as a control point. By fixing this common mode signal constant, a stable X/Y signal can be achieved while still maintaining a usable Z signal.

It will be appreciated by those of ordinary skill in the art that further modifications to and variations of the above-described z-axis thermal accelerometer may be made without departing from the inventive concepts disclosed herein. Accordingly, the invention should not be viewed as limited except as by the scope and spirit of the appended claims.

What is claimed is:

1. A thermal accelerometer, comprising:
a thermal acceleration sensor including a substrate, at least one cavity formed in the substrate, a fluid disposed in the cavity, at least one heater element suspended over the cavity, a mechanism for detecting heat transfer, and heater power adjustment circuitry,
wherein the mechanism for detecting heat transfer includes first and second temperature sensing elements, the first and second temperature sensing elements being disposed substantially in the substrate plane on opposite sides of and at substantially equal distances from the heater element,
wherein the first and second temperature sensing elements are operative to detect a first temperature in response to an acceleration applied in a direction substantially perpendicular to a plane of the substrate, and to provide a first output signal representing the detected first temperature, the first temperature being a common mode temperature, and the first output signal being a common mode output signal, and
wherein the heater power adjustment circuitry is operative to provide a specified power to the heater element so that the first output signal is indicative of the acceleration applied in the direction substantially perpendicular to the substrate plane.

2. The thermal accelerometer of claim 1 wherein the mechanism for detecting heat transfer further includes third and fourth temperature sensing elements, the third and fourth temperature sensing elements being disposed substantially in the substrate plane on opposite sides of and at substantially equal distances from the heater element.

3. The thermal accelerometer of claim 2 wherein the third and fourth temperature sensing elements are operative to detect a differential temperature in response to an acceleration applied in a direction substantially along the substrate plane, and to provide a differential output signal representing the detected differential temperature, the differential output signal being indicative of the acceleration applied substantially along the substrate plane.

4. The thermal accelerometer of claim 3 wherein the first and second temperature sensing elements are disposed along a first axis, and wherein the third and fourth temperature sensing elements are disposed along a second axis, the first axis being substantially perpendicular to the second axis.

5. The thermal accelerometer of claim 1 wherein the first and second temperature sensing elements are further operative to detect a differential temperature in response to an acceleration applied in a direction substantially along the substrate plane, and to provide a differential output signal representing the detected differential temperature, the differential output signal being indicative of the acceleration applied substantially along the substrate plane.

6. The thermal accelerometer of claim 1 wherein the heater power adjustment circuitry is further operative to control the level of heater power directly based on a tunable heater control reference voltage.

7. The thermal accelerometer of claim 6 further including an internal reference voltage for providing an analog common reference point, and wherein a level of the heater control reference voltage is proportional to a level of the internal reference voltage.

8. The thermal accelerometer of claim 7 further including amplification circuitry operative to amplify the first output signal, thereby providing an amplified signal indicative of the acceleration applied substantially perpendicular to the substrate plane,
 wherein the amplified signal has a DC offset associated therewith, and
 wherein the amplification circuitry is operative to adjust a level of the DC offset based on a tunable DC offset-zeroing voltage.

9. The thermal accelerometer of claim 8 wherein a level of the DC offset-zeroing voltage is proportional to the difference between the heater control reference voltage level and the internal reference voltage level.

10. The thermal accelerometer of claim 1 wherein the thermal acceleration sensor is implemented in an integrated circuit.

11. The thermal accelerometer of claim 1 wherein the heat transfer detecting mechanism further includes:
 a first bridge disposed across the cavity, the heater element being disposed on the first bridge; and
 at least one second bridge disposed across the cavity,
 wherein the at least one second bridge intersects the first bridge at substantially a right angle, and
 wherein the first and second temperature sensing elements are disposed on the at least one second bridge on opposites side of and at substantially equal distances from the heater element.

12. The thermal accelerometer of claim 11 wherein a first portion of the at least one second bridge from the heater element to a selected one of the first and second temperature sensing elements has a first thermal resistance, wherein a second portion of the at least one second bridge from the selected one of the first and second temperature sensing elements to the substrate has second thermal resistance, and wherein the first thermal resistance has substantially the same temperature coefficient as the second thermal resistance.

13. The thermal accelerometer of claim 11 wherein the thermal acceleration sensor is implemented in an integrated circuit.

14. The accelerometer of claim 1 wherein the heat transfer detecting mechanism further includes:
 first and second bridges disposed across the cavity, the first and second temperature elements being disposed on the first and second bridges, respectively; and
 a third bridge disposed across the cavity, the heater element being disposed on the third bridge,
 wherein the first, second, and third bridges are substantially parallel to one another.

15. The thermal accelerometer of claim 14 wherein the first and second temperature sensing elements comprise respective thermistors.

16. The thermal accelerometer of claim 14 wherein the thermal acceleration is implemented in an integrated circuit.

* * * * *

UNITED STATES PATENT AND TRADEMARK OFFICE
CERTIFICATE OF CORRECTION

PATENT NO. : 7,392,703 B2
APPLICATION NO. : 11/125759
DATED : July 1, 2008
INVENTOR(S) : Yang Zhao et al.

It is certified that error appears in the above-identified patent and that said Letters Patent is hereby corrected as shown below:

Column 12, claim 14, line 25, "temperature elements" should read --temperature sensing elements--; and Column 12, claim 16, line 35, "acceleration is" should read --acceleration sensor is--.

Signed and Sealed this

Nineteenth Day of January, 2010

David J. Kappos
*Director of the United States Patent and Trademark Office*